(12) United States Patent
Wynn et al.

(10) Patent No.: US 9,563,675 B2
(45) Date of Patent: Feb. 7, 2017

(54) IDENTIFYING SEARCH MATCHES AND ALTERED SEARCH RESULTS

(71) Applicant: Microsoft Technology Licensing, LLC, Redmond, WA (US)

(72) Inventors: Roger H. Wynn, Redmond, WA (US); Brendan D. Elliott, Redmond, WA (US); Wenjun Wang, Redmond, WA (US); Yadriel Gonzalez Perez, Seattle, WA (US); Sivaramakrishna Mopati, Issaquah, WA (US); Jonathan Gordner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 427 days.

(21) Appl. No.: 13/887,223

(22) Filed: May 3, 2013

(65) Prior Publication Data

US 2014/0330810 A1 Nov. 6, 2014

(51) Int. Cl.
*G06F 17/30* (2006.01)

(52) U.S. Cl.
CPC ... *G06F 17/30554* (2013.01); *G06F 17/30696* (2013.01)

(58) Field of Classification Search
CPC ................................................ G06F 17/30554
See application file for complete search history.

(56) References Cited

U.S. PATENT DOCUMENTS

| | | | |
|---|---|---|---|
| 5,515,488 A * | 5/1996 | Hoppe et al. | 345/440 |
| 7,574,426 B1 | 8/2009 | Ortega | |
| 7,590,936 B1 | 9/2009 | Bendig | |
| 8,095,534 B1 | 1/2012 | Alexander | |
| 8,478,745 B1 * | 7/2013 | Garg et al. | 707/722 |
| 8,799,250 B1 * | 8/2014 | Smith et al. | 707/705 |
| 2007/0112761 A1 * | 5/2007 | Xu et al. | 707/5 |

(Continued)

FOREIGN PATENT DOCUMENTS

| | | |
|---|---|---|
| EP | 1679621 A1 | 7/2006 |
| WO | 2008/083504 A1 | 7/2008 |

OTHER PUBLICATIONS

"International Search Report & Written Opinion for PCT Patent Application No. PCT/US2013/060248", Mailed Date: Nov. 25, 2013, Filed Date: Sep. 18, 2013, 14 Pages.
"Search Query Processing", *Business White Paper, FAST Search Best Practices*, Available at <http://download.microsoft.com/download/0/7/3/073431A7-3B32-436A-8DBF-DF5DD2FF0EB6/Search_Query_Processing.pdf>,(2006), 8 pages.

(Continued)

*Primary Examiner* — Kris Mackes
(74) *Attorney, Agent, or Firm* — Bryan Webster; Dan Choi; Micky Minhas

(57) ABSTRACT

In embodiments of identifying search matches and altered search results, a query is received from a device application, and a data search is initiated based on the query that specifies search terms. A search result set of search result items is then received, and properties of a search result item are correlated with the search result item, where the properties indicate why the search result item was returned as part of the search result set. Search terms of the query are also associated with respective properties of the search result item to indicate a correspondence of a search term with a property of the search result item. The search result set of the search result items can then be returned to the device application along with the properties of each search result item and the associated search terms of the query.

20 Claims, 5 Drawing Sheets

(56) References Cited

U.S. PATENT DOCUMENTS

| | | | |
|---|---|---|---|
| 2008/0082497 A1 | 4/2008 | Leblang et al. | |
| 2008/0208819 A1 | 8/2008 | Wang et al. | |
| 2009/0287676 A1 | 11/2009 | Dasdan | |
| 2010/0082634 A1* | 4/2010 | Leban | 707/741 |
| 2010/0312793 A1 | 12/2010 | Brown et al. | |
| 2011/0119243 A1 | 5/2011 | Diamond et al. | |
| 2011/0282906 A1* | 11/2011 | Wong | G06F 17/30831 707/780 |
| 2012/0005198 A1* | 1/2012 | Pontier et al. | 707/723 |
| 2013/0325835 A1* | 12/2013 | Kritt et al. | 707/706 |

OTHER PUBLICATIONS

Cao, et al., "Selecting Query Term Alterations for Web Search by Exploiting Query Contexts", *Proceeding of 46th Annual Meeting of the Association for Computational Linguistics: Human Language Technologies*, Available at <http://aclweb.org/anthology-new/P/P08/P08-1018.pdf>,(Jun. 2008), pp. 148-155.

Dasdan, et al., "Automatic Retrieval of Similar Content Using Search Engine Query Interface", *Proceeding of 18th ACM conference on Information and Knowledge Management*, Available at <http://mashup.pubs.dbs.uni-leipzig.de/files/Automatic_retrieval_of_similar_content_using_search_engine_query_interface.pdf>,(Nov. 2, 2009), pp. 701-710.

Wu, et al., "Indentifying Aspects for Web-Search Queries", *Journal of Artificial Intelligence Research*, vol. 40, Issue 3, Available at <http://www.jair.org/media/3182/live-3182-5568-jair.pdf>,(Mar. 2011), pp. 677-700.

* cited by examiner

IDENTIFYING SEARCH MATCHES AND ALTERED SEARCH RESULTS

BACKGROUND

Many types of computing devices, such as computers, mobile phones, and tablet devices, include client applications and/or processes that perform data searches and other query functions. Currently, when a query is initiated, there is no indication as to why the particular items that are returned are included in a set of query results. This leaves the application or process that initiated the query to attempt a determination as to why a query result item is returned so that the application or process can properly highlight, or otherwise indicate, the applicability of the query result item, such as when displayed for user feedback.

The attempts by an application or process that initiated a query to determine why particular query result items are returned can be inconsistent, and sometimes inaccurate. For example, incorrect words may be matched in response to a query, or alternatively, no matches for the query are found. In different languages, some equivalent words may have different lengths or formats, and may not be returned as a match to a query. Additionally, some searching techniques implement postfix matching, while others implement a prefix matching scheme, and query alterations and linguistic equivalence may not be accounted for. These inconsistent search criteria may also result in inconsistent and/or inaccurate query results, lending to a poor user experience.

SUMMARY

This Summary introduces features and concepts of identifying search matches and altered search results, which is further described below in the Detailed Description and/or shown in the Figures. This Summary should not be considered to describe essential features of the claimed subject matter, nor used to determine or limit the scope of the claimed subject matter.

Identifying search matches and altered search results is described. In embodiments, a query is received from a device application, and a data search is initiated based on the query that specifies search terms. A search result set of search result items is then received, and properties of a search result item are correlated with the search result item, where the properties indicate why the search result item was returned as part of the search result set. Search terms of the query are also associated with respective properties of the search result item to indicate a correspondence of a search term with a property of the search result item. The search result set of the search result items can then be returned to the device application along with the properties of each search result item and the associated search terms of the query.

In implementations, a search result item includes one or more presentation templates that indicate how the search result item can be displayed in a search result user interface. A presentation template can be selected for the search result item based on the properties of the search result item. A search input can be received to further filter the search result set for a subset of the search result items. The filtered search result items are determined responsive to the search input, and the subset of the search result items are returned along with the properties that correlate to each of the search result items in the subset.

In implementations, a property query can be initiated for a search result item to determine the properties that are correlated with the search result item, and the properties that are correlated with the search result item are received responsive to the property query. The search result item can self-express why the item was returned as part of the search result set based on the properties of the search result item. Additionally, the query as originally initiated can be received back responsive to the property query to associate the search terms of the query with the respective properties of the search result item. Additionally, a presentation template for a property that is correlated with the search result item can be received responsive to the property query, where the presentation template indicates how the search result item can be displayed in a search result user interface based on the property that is correlated with the search result item.

BRIEF DESCRIPTION OF THE DRAWINGS

Embodiments of identifying search matches and altered search results are described with reference to the following Figures. The same numbers may be used throughout to reference like features and components that are shown in the Figures.

DETAILED DESCRIPTION

Embodiments of identifying search matches and altered search results are described and may be implemented by any type of computing device or system that supports or implements queries and other data searches. A query consumer, such as a device application, client application, or search indexer, can identify and determine the properties of a search result item that caused the search result item to be relevant and included in a query search result set. A query consumer can also identify the particular parts of a property that are matched to a query. A search result item can self-express why the search result item was returned as part of a search result set based on the properties of the search result item, and the properties that were matched to a query. Altered search result items can also be expressed in the search result property matching. A search result item can also include presentation templates that indicate how a search result item is displayed in a search result user interface.

While features and concepts of identifying search matches and altered search results can be implemented in any number of different devices, systems, networks, environments, and/or configurations, embodiments of identifying search matches and altered search results are described in the context of the following example devices, systems, and methods.

Figure 1:
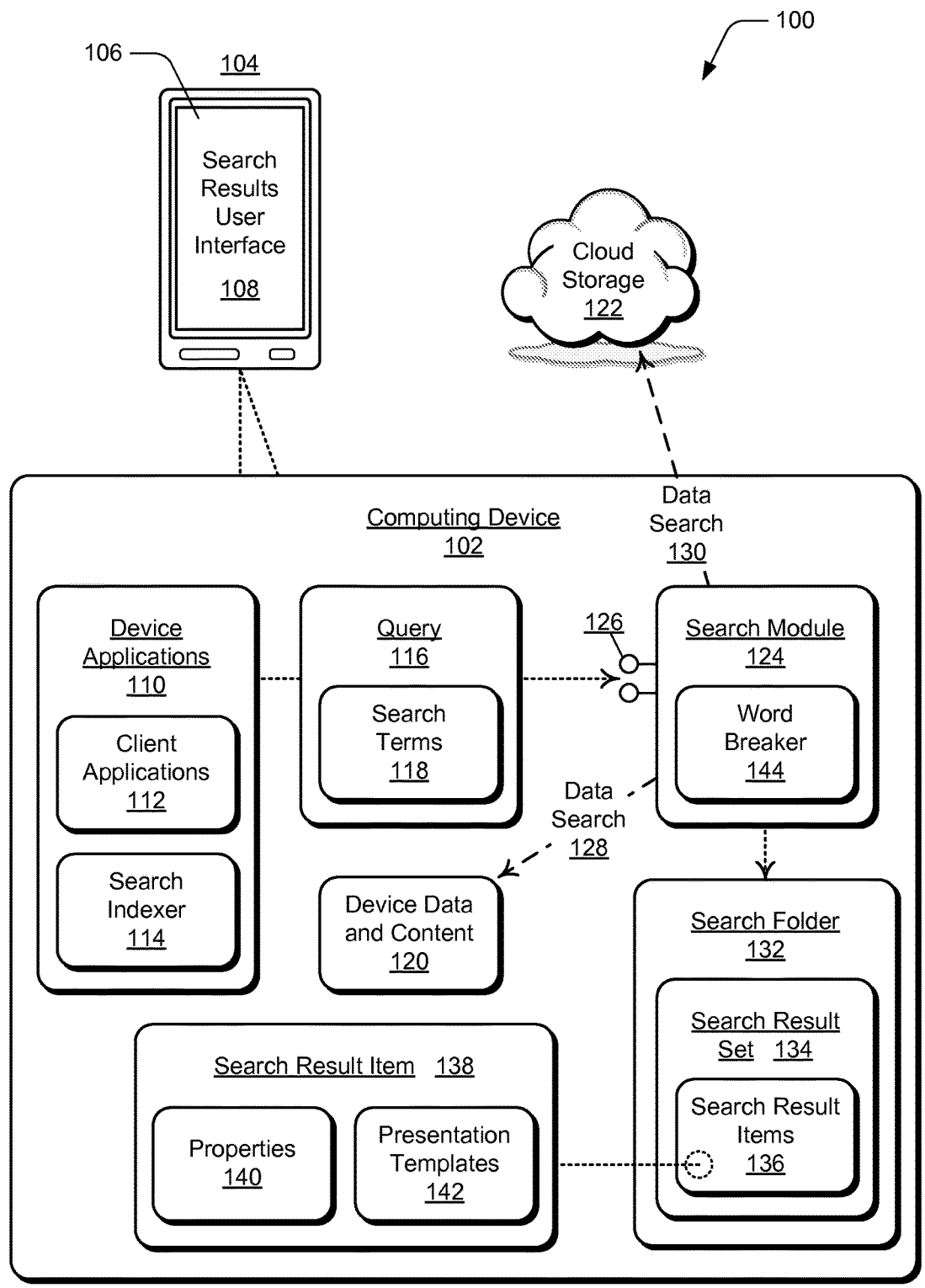
FIG. 1 illustrates an example system in which embodiments of identifying search matches and altered search results can be implemented.

FIG. 1 illustrates an example system 100 in which embodiments of identifying search matches and altered search results can be implemented. The system 100 includes an example computing device 102 that may be any one or combination of a wired or wireless device, such as a mobile phone, tablet, computing, communication, entertainment, gaming, media playback, desktop computer, and/or other type of device implemented as a computing device. For example, a mobile device 104, such as a mobile phone or tablet device, includes an integrated display device 106 on which a search results user interface 108 can be displayed to facilitate a user initiating a data search in the form of a query, and reviewing search results of the query that are returned and displayed for viewing. Any of the devices described herein, such as the computing device 102 and the mobile device 104, can be implemented with various components, such as a processing system and memory, as well as any number and combination of differing components as further described with reference to the example device shown in FIG. 6.

The computing device 102 can include device applications 110, such as client applications 112 and/or a search indexer 114, that may initiate or facilitate a query 116 for a data search. The device applications 110, client applications 112, and/or the search indexer 114 are also referred to herein as query consumers that facilitate a search of content and receive query search results, such as a client music application that searches for music files, or a client email application that searches emails. For example, a client application 112 may be an email client application that is implemented to facilitate a user accessing, reading, generating, and sending emails. A user of the computing device may initiate a query 116, such as to locate past emails on a particular date and/or emails that discuss a particular topic, which can be searched based on a word or phrase that the emails are likely to contain. The query 116 includes search terms 118 of the query. In the email search example, the search terms may include the date (e.g., month, day, and/or year terms), as well as a word or words in a phrase.

The search indexer 114 may be implemented to index and search all device data and content 120 on the computing device, as well as network-based stored data (also referred to as cloud-based, or "in the cloud"), shown as cloud storage 122. For example, an email client application 112 may be associated with a Web-based data hosting service implemented as the cloud storage 122. The cloud storage data and/or the device data and content 120 can include, but is not limited to, file names, file contents, file directory paths, metadata, music files, video files, emails, documents, images, text, etc. that may be searched, indexed, and/or displayed as search results in a user interface.

Any of the devices described herein can communicate via a network, such as for data communication between the computing device 102 and the cloud storage 122, and the network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The computing device 102 includes a search module 124 that can be implemented as a software application (e.g., executable instructions) stored on computer-readable storage media, such as any suitable memory device or electronic data storage. The computing device 102 can be implemented with computer-readable storage media as described with reference to the example device shown in FIG. 6. Additionally, the computing device can be executed with a processing system to implement embodiments of identifying search matches and altered search results, as described herein. As described herein, the search module may be any type of search application or device that supports search applications and/or search functions, such as in the form of a query 116 for a data search. The search module 124 may also expose application program interfaces (APIs) 126 that are utilized by the device applications 110 to interface query requests with the search module 124.

In embodiments, the search module 124 is implemented to receive a query 116 that includes the search terms 118 from a device application 110 and initiate a data search 128 of the device data and content 120, and/or initiate a data search 130 of the cloud storage 122. The computing device 102 can include a search folder 132 to maintain a search result set 134 of search result items 136 that are received responsive to the query. An example search result item 138 illustrates that each of the search result items may include properties 140 and/or presentation templates 142 that are associated with a respective search result item. A property 140 of a search result item 138 may be content, a filename, part of a document, a date, an item in a directory path, an author associated with a search result item, a document owner, and/or any other type of property that may be associated with a particular search result item.

In embodiments, the search module 124 attaches data to each search result item 136 that indicates the properties 140 of a search result item 138 that are the basis for the search result item being included in the search result set 134. A "hit" property refers to a property of a search result item that caused the search result item to be returned as part of the query search result set 134. The search module 124 is implemented to correlate one or more properties 140 of a search result item with the search result item, where the properties indicate why the search result item was returned as part of the search result set 134. The search module 124 is also implemented to associate a search term 118 of the query 116 with a property 140 of the search result item 138 to indicate a correspondence of the search term with the property of the search result item.

The presentation templates 142 that are associated with a search result item 138 indicate how the search result item can be displayed in a search result user interface. For example, a search query of user contacts may return a phone number for a particular contact (e.g., a person or business listed in the contacts of a client application). Rather than simply displaying the phone number in a search results user interface, a presentation template 142 that is associated with the search result item 138 can indicate to display a name of the contact and a mobile phone icon to indicate the mobile phone number of the contact. The search module 124 can determine and select a presentation template 142 to display a search result item 138 in a search results user interface based on the returned properties 140 of the search result item.

The presentation templates may include a user interface template that can be used to display multiple returned properties, and/or may include a "type" user interface template that can be used when most of the returned properties are of a particular type (e.g., music, pictures, etc.). Alternatively or in addition to the presentation templates 142, a search result item may also include rules that indicate or suggest how the search result item and/or the overall search results should be represented in a user interface based on the properties 140 that lend to the search result item being part of the search result set.

The search module 124 can then return the search result set 134 of the search result items 136 to the device application 110 that initiated the query 116, along with the properties 140 of the respective search result items and the search terms 118 of the query that are associated with the properties of the search result items. In implementations, a "query hits" property of a device operating system can be exposed that the search indexer 114 attaches to a search result item 136 returned from the query 116. This query hits property can be a list of the properties, such as in a multi-string field, that indicate which properties caused the search result item to be returned as part of the query search result set 134.

Queries that are performed via a search API 126 of the search module 124 can access the search folder 132, where the original information about the query can be stored, such as the query string and language of the query, so that a search result item can request the information from the folder. The information of the query can also be passed from the search folder to the search result item. Additionally, the search module 124 is implemented such that a search result item 136, or a query consumer directly, can determine which of the query hits properties are relevant to a search result item being included in the search result set 134.

In implementations, an API 126 includes a "hit finder" interface that a query consumer (e.g., device applications 110) passes content for searching, as well as the property that the content represents, if any. The query consumer can parse the query hits property directly and call this API for each hit property. A different API can be exposed by the search result item itself, as opposed to being stand-alone like the hit finder interface. This enables the search result item to express the relevant information itself, such as in a table mapping of "hit" properties to an array of "hits" within that property. The query consumer can use a "get search hits" interface to determine why a search result item was included in the query search result set.

As part of determining the relevancy of the search result items, modifications in the search terms 118 of the query 116 can be applied to the properties 140 of a search result item 138 to improve the accuracy of the search result set 134 and what is returned to a query consumer. In embodiments, a word breaker 144 can be implemented as a component (e.g., a software module or component) of the search module 124, and the word breaker is implemented to identify linguistically appropriate words or matches in a search query string. For example, the word breaker can identify words in different formats and languages, such as for languages that do not use spaces between words (e.g., Japanese, Chinese, etc.) or for languages that have many compound words (e.g., German, etc.). The word breaker 144 may also implement a normalized string comparison to ignore linguistically unimportant differences between words and other query strings, such as for case, character width, kana type (in Japanese), and for some languages, accents and diacritics that denote phonetic differences.

Examples of search term modifications can include any type of text and/or format changes. For example, a query of "MSFT" will also include results on "Microsoft", a query of "3/1/13" will also include hits on "Mar. 1, 2013", and a query of "March" will also include hits on "8" as the eighth calendar month. The search term modifications can also account for different language formats, such as if user searches for "19,3" (with a comma) in a Polish language format, the search will include a result of "19.3" (with a point) in English language format, recognizing a likely search intention of the user. A typical search technique may perform a text string search for "March" and only return instances and variations of the text string, such as "March", "march", "marched", etc. However, in implementations of the techniques described herein, the search module 124 is implemented to not only return the instances and variations of the text string, but will also return content that includes the search string, relevant dates (e.g., a modification date, or a last access date), the search term modifications, and any other associated and/or corresponding results.

Figure 2:
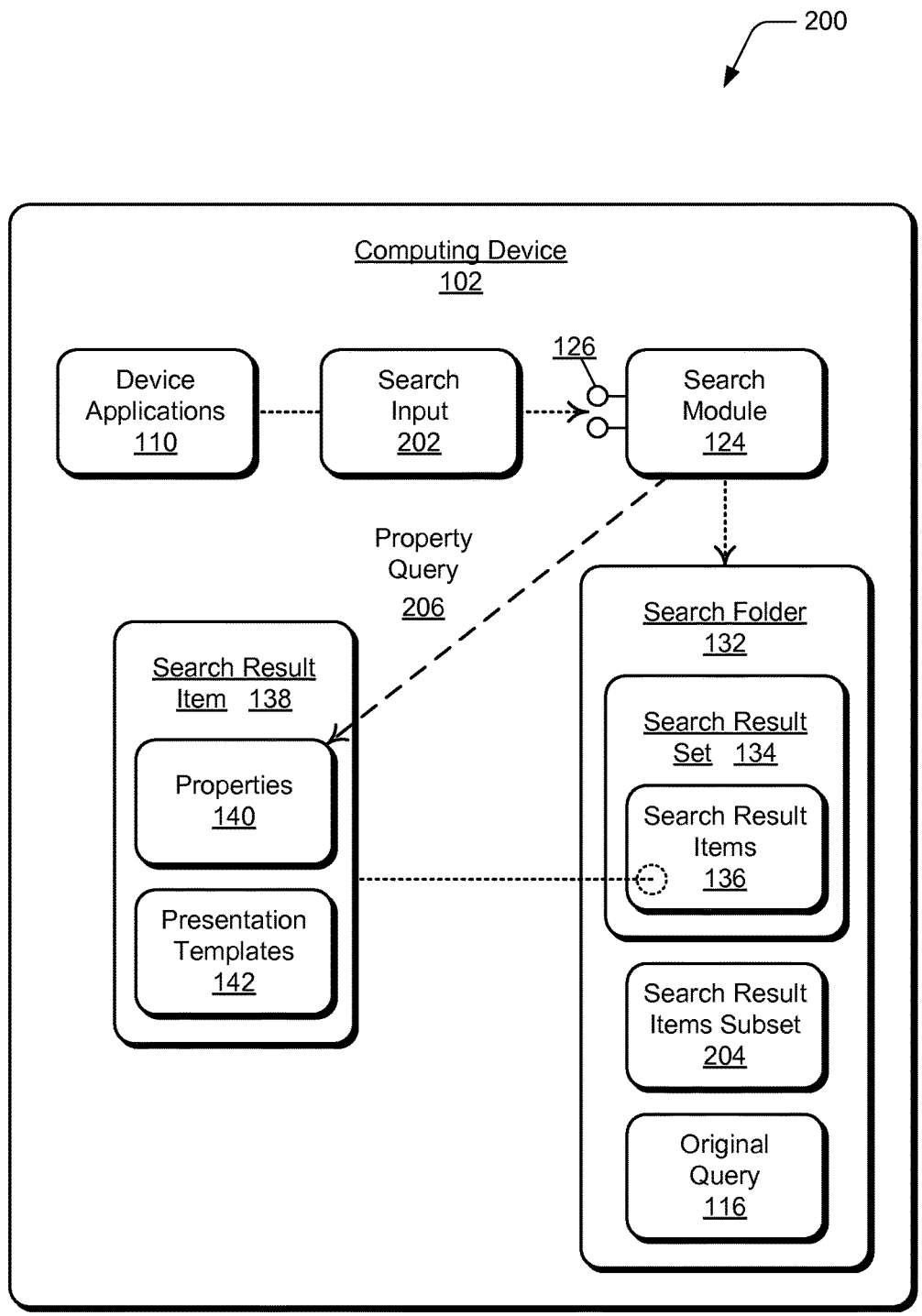
FIG. 2 illustrates an implementation of the example system in which embodiments of identifying search matches and altered search results can be implemented.

FIG. 2 illustrates an example implementation 200 of the example system 100 shown and described with reference to FIG. 1. This implementation of the computing device 102 includes the device applications 110 (e.g., query consumers), the search module 124, and the search folder 132. The search folder includes the search result set 134 of search result items 136, such as the example search result item 138 that has the associated properties 140 and the presentation templates 142.

In embodiments, the search module 124 can receive a search input 202, such as via the APIs 126 described above, to further filter the search result set 134 for a subset 204 of the search result items 136. For example, a contacts application (e.g., one of the device applications 110) may return a long list of contacts as the search result set 134. A user may want to filter down the returned search result items, not as a query, but rather as a filtered search. As the user types in an area code as a search term, for example, the search module can query the items returned for a property that correlates to the area code of the filtered search to identify the relevant search result items. The search module 124 can determine the filtered search result items responsive to the search input, and then return the subset 204 of the search result items along with the properties that correlate to each of the search result items 136 in the subset.

In embodiments, the search module 124 can initiate a property query 206 of a search result item 138 to determine the one or more properties 140 that are correlated with the search result item, and the search module receives back the properties that are correlated with the search result item responsive to the property query. The search result item 138 self-expresses why the search result item was returned as part of the search result set 134 based on the properties 140 of the search result item.

The search folder 132 can also be implemented to maintain the query 116 as originally initiated, which can then be referenced to correlate with the search result items 136. The original query data, to include the applied search terms 118 of the query as well as equivalence alterations of the search terms, is accessible by the search module 124 to determine why a property of a search result item 136 is part of a query result. The search module 124 can also receive back the query as originally initiated responsive to the property query 206, and associate search terms 118 of the query 116 with the properties 140 of a search result item to indicate a correspondence of the search terms with the properties of the search result item.

The search module 124 can also receive back a presentation template 142 for a property 140 that is correlated with a search result item responsive to the property query 206. As noted above, the presentation template indicates how the search result item can be displayed in a search result user interface based on the property that is correlated with the search result item. All of available information can then be aggregated and passed to the query consumer (e.g., a client application, search indexer, or other type of query consumer). The search result items 136 can then express to the query consumer the available information that is passed to the query consumer along with the search result items.

Example methods 300, 400, and 500 are described with reference to respective FIGS. 3, 4, and 5 in accordance with one or more embodiments of identifying search matches and altered search results. Generally, any of the services, components, modules, methods, and operations described herein can be implemented using software, firmware, hardware (e.g., fixed logic circuitry), manual processing, or any combination thereof. The example methods may be described in the general context of executable instructions stored on computer-readable storage media that is local and/or remote to a computer processing system, and implementations can include software applications, programs, functions, and the like.

Figure 3:
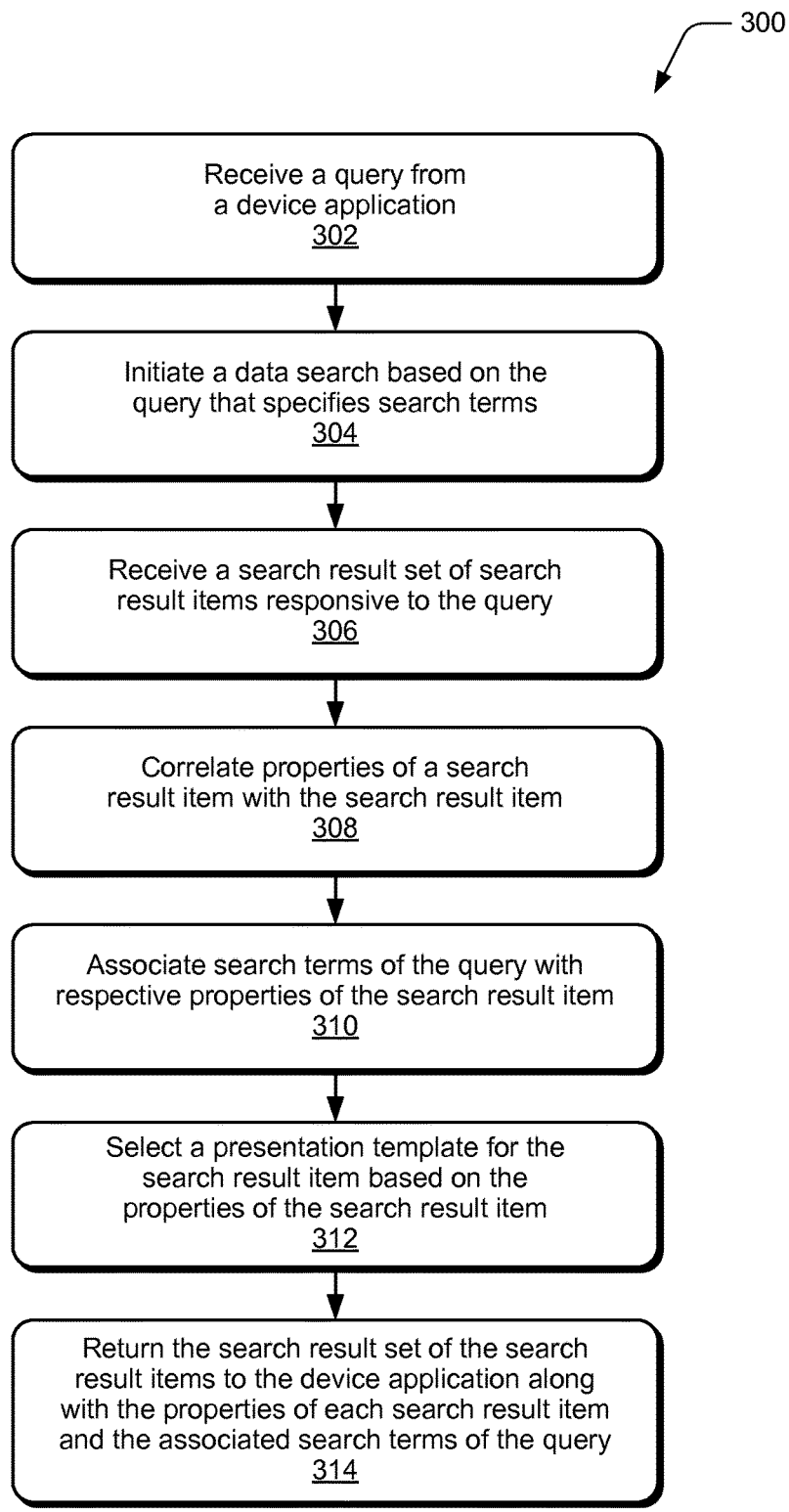
FIG. 3 illustrates example method(s) of identifying search matches and altered search results in accordance with one or more embodiments.

FIG. 3 illustrates example method(s) 300 of identifying search matches and altered search results, and is generally described with reference to a search module. The order in which the method is described is not intended to be construed as a limitation, and any number or combination of the method operations can be performed in any order to implement a method, or an alternate method.

At 302, a query is received from a device application. For example, the search module 124 at the computing device 102 (FIG. 1) receives a query 116 from a device application 110, and the query specifies search terms 118. The device application 110 is a query consumer, and may be an email client application that communicates a user data search to locate past emails, or a music application that searches to locate particular music files. Alternatively, the device application may be the search indexer 114 for the computing device that indexes and searches the device data and content 120 on the computing device 102, as well as network-based stored data, shown as the cloud storage 122.

At 304, a data search is initiated based on the search terms of the query. For example, the search module 124 initiates the data search 128 of the device data and content 120, and/or initiates the data search 130 of the cloud storage 122, based on the search terms 118 of the query 116. The data search may include searching the device data and content 120, which can include any type of files, documents, and content. The data search may also include searching the cloud storage 122 (e.g., networked data), such as a Web-based email service that stores email messages and user contacts data, or a music service that the computing device accesses music for playback on the device.

At 306, a search result set of search result items is received responsive to the query. For example, the search module 124 receives the search result set 134 of search result items 136 in response to the query 116. The search result set 134 of the search result items 136 are maintained in the search folder 132 on the computing device 102. The search folder 132 can also be utilized to maintain the query 116 as originally initiated, which can then be referenced to correlate with the search result items 136.

At 308, properties of a search result item are correlated with the search result item. For example, the search module 124 correlates one or more properties 140 of the search result item 138 with the search result item, and the properties indicate why the search result item was returned as part of the search result set 134. The search result item 138 is an example of any of the search result items 136 of the search result set 134. With the attached properties 140, the search result item 138 can self-express why the search result item was returned as part of the search result set.

At 310, search terms of the query are associated with respective properties of the search result item. For example, the search module 124 associates one or more of the search terms 118 of the query 116 with the respective properties 140 of the search result item 138 to indicate a correspondence of a search term with a property of the search result item.

At 312, a presentation template for the search result item is selected based on the properties of the search result item. For example, the search module 124 selects a presentation template 142 for the search result item based on the properties 140 of the search result item. A search result item can include the one or more presentation templates 142 that indicate how the search result item can be displayed in a search result user interface.

At 314, the search result set of the search result items is returned to the device application along with the properties of each search result item and the associated search terms of the query. For example, the search module 124 returns the search result set 134 of the search result items 136 to the device application 110 along with the one or more properties 140 of each search result item and the associated search terms 118 of the query 116.

Figure 4:
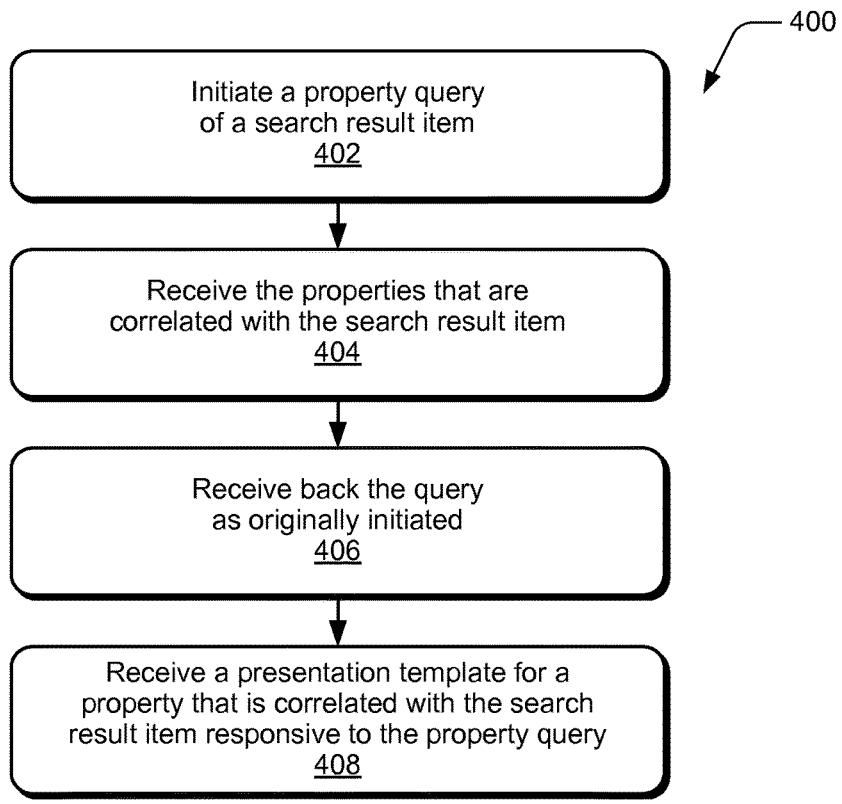
FIG. 4 illustrates example method(s) of identifying search matches and altered search results in accordance with one or more embodiments.

FIG. 4 illustrates example method(s) 400 of identifying search matches and altered search results, and is generally described with reference to a search module. The order in which the method is described is not intended to be construed as a limitation, and any number or combination of the method operations can be performed in any order to implement a method, or an alternate method.

At 402, a property query of a search result item is initiated. For example, the search module 124 at the computing device 102 (FIG. 2) initiates a property query 206 of the search result item 138 to determine the one or more properties 140 that are correlated with the search result item. At 404, the properties that are correlated with the search result item are received responsive to the property query. For example, the search module 124 receives the one or more properties 140 that are correlated with the search result item 138 responsive to the property query 206.

At 406, the query as originally initiated is received back responsive to the property query. For example, the search module 124 also receives back the original query 116 (e.g., the query as originally initiated), and the search module associates the search terms 118 of the query with the respective one or more properties 140 of the search result item 138.

At 408, a presentation template for a property that is correlated with the search result item is received responsive to the property query. For example, the search module 124 receives a presentation template 142 for a property 140 that is correlated with the search result item 138 responsive to the property query 206. The presentation template 142 indicates how the search result item 138 can be displayed in a search result user interface based on the property 140 that is correlated with the search result item.

Figure 5:
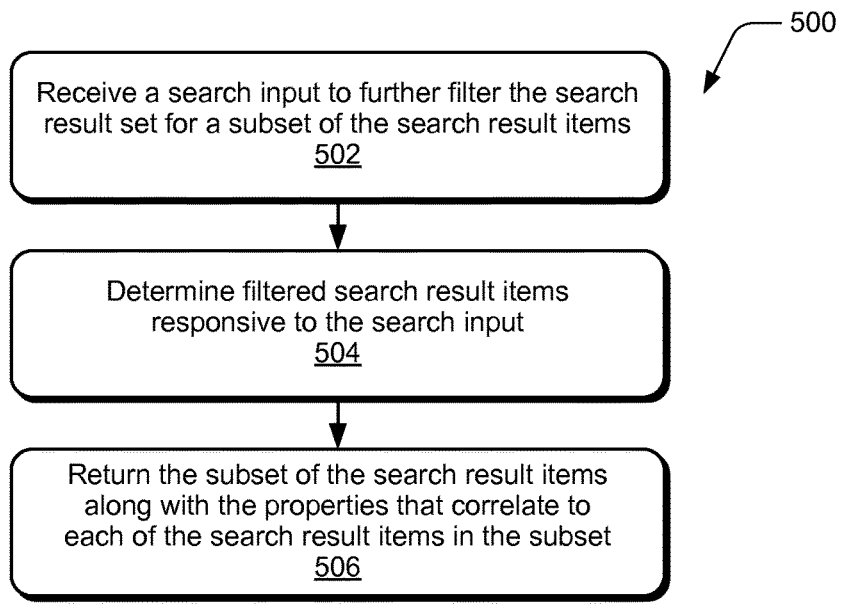
FIG. 5 illustrates example method(s) of identifying search matches and altered search results in accordance with one or more embodiments.

FIG. 5 illustrates example method(s) 500 of identifying search matches and altered search results, and is generally described with reference to a search module. The order in which the method is described is not intended to be construed as a limitation, and any number or combination of the method operations can be performed in any order to implement a method, or an alternate method.

At 502, a search input is received to further filter the search result set for a subset of the search result items and, at 504, filtered search result items are determined responsive to the search input. For example, the search module 124 at the computing device 102 (FIG. 2) receives the search input 202 from a device application 110 when the search input is initiated to further filter the search result set 134 for a subset 204 of the search result items 136. The search module 124 determines the subset 204 of filtered search result items responsive to the search input 202.

At 506, the subset of the search result items is returned along with the properties that correlate to each of the search result items in the subset. For example, the search module 124 returns the subset 204 of the search result items 136 to the device application 110 (e.g., a query consumer) along with the one or more properties 140 that correlate to each of the search result items in the subset.

Figure 6:
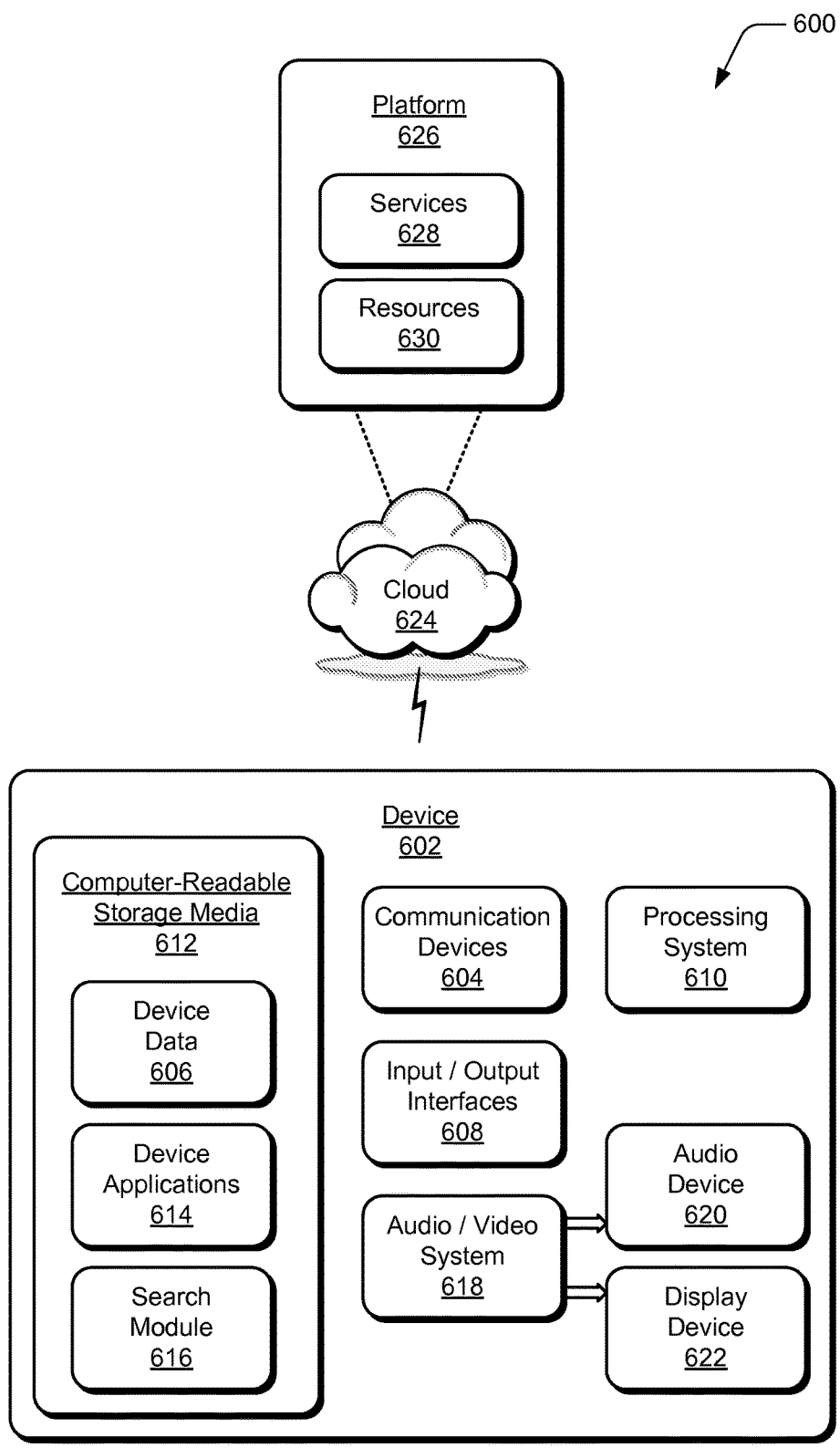
FIG. 6 illustrates an example system with an example device that can implement embodiments of identifying search matches and altered search results.

FIG. 6 illustrates an example system 600 that includes an example device 602, which can implement embodiments of identifying search matches and altered search results. The example device 602 can be implemented as any of the devices and/or servers described with reference to the previous FIGS. 1-5, such as any type of client device, mobile phone, tablet, computing, communication, entertainment, gaming, media playback, and/or other type of device. For example, the computing device 102 and/or the cloud storage 122 shown in FIG. 1 may be implemented as the example device 602.

The device 602 includes communication devices 604 that enable wired and/or wireless communication of device data 606, such as email messages that are received, routed, stored, and/or delivered as the outgoing emails. Additionally, the device data can include any type of audio, video, and/or image data. The communication devices 604 can also include transceivers for cellular phone communication and for network data communication.

The device 602 also includes input/output (I/O) interfaces 608, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 602 includes a processing system 610 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The device 602 also includes computer-readable storage media 612, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 612 provides storage of the device data 606 and various device applications 614, such as an operating system that is maintained as a software application with the computer-readable storage media and executed by the processing system 610. For example, the device applications may include the client application 112 and/or the search indexer 114 as described with reference to FIG. 1. In this example, the device applications also include a search module 616 that implements embodiments of identifying search matches and altered search results, such as when the example device 602 is implemented as the computing device 102 shown in FIG. 1. An example of the search module 616 is the search module 124 of the computing device 102, as described with reference to FIGS. 1-5.

The device 602 also includes an audio and/or video system 618 that generates audio data for an audio device 620 and/or generates display data for a display device 622. The audio device and/or the display device include any devices that process, display, and/or otherwise render audio, video, display, and/or image data. In implementations, the audio device and/or the display device are integrated components of the example device 602. Alternatively, the audio device and/or the display device are external, peripheral components to the example device.

In embodiments, at least part of the techniques described for identifying search matches and altered search results may be implemented in a distributed system, such as over a "cloud" 624 in a platform 626. The cloud 624 includes and/or is representative of the platform 626 for services 628 and/or resources 630. For example, the services 628 and/or the resources 630 may include the search module 124 described with reference to FIG. 1, as well as searchable data and content.

The platform 626 abstracts underlying functionality of hardware, such as server devices (e.g., included in the services 628) and/or software resources (e.g., included as the resources 630), and connects the example device 602 with other devices, servers, etc. The resources 630 may also include applications and/or data that can be utilized while computer processing is executed on servers that are remote from the example device 602. Additionally, the services 628 and/or the resources 630 may facilitate subscriber network services, such as over the Internet, a cellular network, or Wi-Fi network. The platform 626 may also serve to abstract and scale resources to service a demand for the resources 630 that are implemented via the platform, such as in an interconnected device embodiment with functionality distributed throughout the system 600. For example, the functionality may be implemented in part at the example device 602 as well as via the platform 626 that abstracts the functionality of the cloud 624.

Although embodiments of identifying search matches and altered search results have been described in language specific to features and/or methods, the appended claims are not necessarily limited to the specific features or methods described. Rather, the specific features and methods are disclosed as example implementations of identifying search matches and altered search results.

The invention claimed is:

1. A computer-implemented method, comprising:
executing a search module on a processor of a computing device to perform:
initiating a data search based on a query that specifies search terms;
receiving a search result set of search result items responsive to the query;
correlating one or more properties of a search result item as hit properties of the search result item, the hit properties being a textual match to the query and including information associated with the search result item indicating why the search result item was returned as part of the search result set;
associating one or more of the search terms of the query with respective one or more hit properties of the search result item to indicate a correspondence of a search term with a hit property of the search result item;
determining a presentation template configured to format the search result item for display in a search result user interface on the computing device based on a type of the search result item;
initiating a property query of the search result item to determine the one or more hit properties that are correlated with the search result item;
receiving the one or more hit properties that are correlated with the search result item responsive to the property query; and
displaying the one or more hit properties that are correlated with the search result item in the search results user interface on a display of the computing device, each of the displayed one or more hit properties indicating a correspondence with the associated one or more search terms to indicate the applicability of the search result item.

2. A method as recited in claim 1, further comprising:
receiving the query from a device application; and
returning the search result set of the search result items to the device application along with the one or more hit properties of each search result item and the one or more associated search terms of the query.

3. A method as recited in claim 1, wherein the search result item is configured to self-express by exposing an application program interface configured to indicate through a user interface why the search result item was returned as part of the search result set based on the one or more hit properties of the search result item.

4. A method as recited in claim 1, wherein the search result item includes one or more presentation templates that indicate how the search result item can be displayed in a search result user interface.

5. A method as recited in claim 1, wherein said determining the presentation template for the search result item is further based on the one or more hit properties of the search result item that caused the search result item to be included in the search result set.

6. A method as recited in claim 1, further comprising:
receiving back the query as originally initiated responsive to the property query for said associating the one or more search terms of the query with the respective one or more hit properties of the search result item.

7. A method as recited in claim 1, further comprising:
receiving a presentation template for a hit property that is correlated with the search result item responsive to the property query, the presentation template for the hit property indicating how the search result item can be displayed in the search result user interface based on the hit property that is correlated with the search result item.

8. A method as recited in claim 1, further comprising:
receiving a search input to further filter the search result set for a subset of the search result items;
determining filtered search result items responsive to the search input; and
returning the subset of the search result items along with the one or more hit properties that correlate to each of the search result items in the subset.

9. A method as recited in claim 1, wherein said initiating the property query of the search result item is performed responsive to a user requesting additional information about the search result item via an Application Programming Interface (API).

10. A computing device, comprising:
a memory to maintain one or more device applications that are each configured to initiate a query that specifies search terms;
a processing system to implement a search module that is configured to:
receive a search result set of search result items responsive to the query;
correlate a property of a search result item as a hit property with the search result item, the hit property being a textual match to the query and including information associated with the search result item indicating why the search result item was returned as part of the search result set;
associate a search term of the query with the hit property of the search result item to indicate a correspondence of the search term with the hit property of the search result item;
determine a presentation template that indicates how to format the search result item for display in a search result user interface on the computing device based on a type of the search result item;
initiate a property query of the search result item to determine one or more hit properties that are correlated with the search result item; and
receive the one or more hit properties that are correlated with the search result item responsive to the property query, the one or more hit properties displayable in the search results user interface each with an indication of what text-matched with the search terms of the query.

11. A computing device as recited in claim 10, wherein the search module is configured to:
receive the query from a device application; and
return the search result set of the search result items to the device application along with the hit property of the search result item and the search term of the query that is associated with the hit property of the search result item.

12. A computing device as recited in claim 10, wherein the search result item is received with one or more presentation templates that indicate how to format the search result item for display in a search result user interface.

13. A computing device as recited in claim 10, wherein the search module is configured to determine the presentation template for the search result item further based on the hit property of the search result item that caused the search result item to be included in the search result set.

14. A computing device as recited in claim 10, wherein:
the memory is configured to maintain a search folder of query information that includes the query, the search result set of the search result items, and the one or more hit properties that correlate to each of the respective search result items.

15. A computing device as recited in claim 10, wherein the search module is configured to receive back the query as originally initiated responsive to the property query.

16. A computing device as recited in claim 10, wherein the search module is configured to receive a presentation template for the hit property that is correlated with the search result item responsive to the property query, the presentation template indicating how the search result item can be displayed in a search result user interface based on the hit property that is correlated with the search result item.

17. A computing device as recited in claim 10, wherein the search module is configured to:
 receive a search input to further filter the search result set for a subset of the search result items;
 determine filtered search result items responsive to the search input; and
 return the subset of the search result items along with the one or more hit properties that correlate to each of the search result items in the subset.

18. Computer-readable storage media comprising a search module stored as instructions that are executable and, responsive to execution of the instructions by a computing device, the computing device performs operations of the search module comprising to:
 initiate a data search based on a query that specifies search terms;
 receive a search result set of search result items responsive to the query with at least one search result item including one or more presentation templates that indicate a format for how the search result item can be displayed in a search result user interface based on a type of the search result item;
 correlate one or more properties of the search result item as hit properties of the search result item, the hit properties being a textual match to the query and including information associated with the search result item indicating why the search result item was returned as part of the search result set; and
 return the search result set of the search result items to a device application along with the one or more hit properties of the search result item and a selected presentation template of the search result item, the one or more hit properties displayable to indicate why the search result item was returned as part of the search result set in the search results user interface.

19. Computer-readable storage media as recited in claim 18, wherein the computing device performs the operations of the search module further comprising to associate one or more of the search terms of the query with respective one or more hit properties of the search result item to indicate a correspondence of a search term with a hit property of the search result item.

20. Computer-readable storage media as recited in claim 18, wherein the computing device performs the operations of the search module further comprising to:
 determine the selected presentation template for the search result item further based on the one or more hit properties of the search result item that caused the search result item to be included in the search result set.

* * * * *